US012689065B2

(12) United States Patent
Kim et al.

(10) Patent No.: US 12,689,065 B2
(45) Date of Patent: Jul. 21, 2026

(54) ELECTRODE ASSEMBLY AND SECONDARY BATTERY INCLUDING THE SAME

(71) Applicant: LG ENERGY SOLUTION, LTD., Seoul (KR)

(72) Inventors: Jin Soo Kim, Daejeon (KR); Hyoung Kwon Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 652 days.

(21) Appl. No.: 18/029,202

(22) PCT Filed: Nov. 15, 2021

(86) PCT No.: PCT/KR2021/016661
§ 371 (c)(1),
(2) Date: Mar. 29, 2023

(87) PCT Pub. No.: WO2022/103227
PCT Pub. Date: May 19, 2022

(65) Prior Publication Data
US 2023/0369656 A1     Nov. 16, 2023

(30) Foreign Application Priority Data

Nov. 16, 2020    (KR) .......................... 10-2020-0152524
Nov. 9, 2021    (KR) .......................... 10-2021-0153233

(51) Int. Cl.
*H01M 10/0587*       (2010.01)
*H01M 50/434*        (2021.01)
(Continued)

(52) U.S. Cl.
CPC ..... *H01M 10/0587* (2013.01); *H01M 50/434* (2021.01); *H01M 50/449* (2021.01); *H01M 50/469* (2021.01); *H01M 50/533* (2021.01)

(58) Field of Classification Search
CPC .................................................. H01M 10/0587
See application file for complete search history.

(56) References Cited

U.S. PATENT DOCUMENTS 5,549,717 A       8/1996  Takeuchi et al.
2003/0180605 A1 *  9/2003  Mizutani ............ H01M 10/052
                                           429/211
(Continued)

FOREIGN PATENT DOCUMENTS

CN          1465116 A      12/2003
CN          1612402 A      5/2005
(Continued)

OTHER PUBLICATIONS

Extended European Search Report for European Application No. 21892394.4, dated Oct. 21, 2024.
(Continued)

*Primary Examiner* — Brian R Ohara
(74) *Attorney, Agent, or Firm* — Birch, Stewart, Kolasch & Birch, LLP

(57) ABSTRACT

An electrode assembly includes a first electrode; a second electrode; a separation membrane interposed between the first electrode and the second electrode, in which the first electrode, the second electrode, and the separation membrane are wound together to form a jelly-roll structure; and an auxiliary separation membrane disposed between the first electrode and the separation membrane in a center of the jelly-roll structure.

14 Claims, 7 Drawing Sheets

(51) Int. Cl.
   *H01M 50/449* (2021.01)
   *H01M 50/469* (2021.01)
   *H01M 50/533* (2021.01)

(56) References Cited

U.S. PATENT DOCUMENTS

| | | | |
|---|---|---|---|
| 2005/0095505 A1* | 5/2005 | Ohata | H01M 10/0587 |
| | | | 429/246 |
| 2006/0222934 A1 | 10/2006 | Min et al. | |
| 2016/0218386 A1 | 7/2016 | Park et al. | |
| 2018/0108494 A1 | 4/2018 | Takahashi et al. | |
| 2018/0233301 A1* | 8/2018 | Kano | H01M 50/46 |
| 2018/0315970 A1 | 11/2018 | Terashima et al. | |
| 2019/0198851 A1 | 6/2019 | Woo et al. | |
| 2019/0288290 A1* | 9/2019 | Minami | H01M 10/0525 |
| 2021/0265708 A1 | 8/2021 | Lim et al. | |

FOREIGN PATENT DOCUMENTS

| | | | |
|---|---|---|---|
| CN | 207602698 U | 7/2018 |
| CN | 110277534 A | 9/2019 |
| JP | 2973540 B2 | 11/1999 |
| JP | 2000-164246 A | 6/2000 |
| JP | 2002-100396 A | 4/2002 |
| JP | 2003-51339 A | 2/2003 |
| JP | 2003-208883 A | 7/2003 |
| JP | 2005-285691 A | 10/2005 |
| JP | 2018-67595 A | 4/2018 |
| KR | 10-2006-0102251 A | 9/2006 |
| KR | 10-2009-0006565 A | 1/2009 |
| KR | 10-1292656 B1 | 8/2013 |
| KR | 10-2014-0065053 A | 5/2014 |
| KR | 10-2015-0071250 A | 6/2015 |
| KR | 10-2016-0091199 A | 8/2016 |
| KR | 10-2017-0068594 A | 6/2017 |
| KR | 10-2018-0028837 A | 3/2018 |
| KR | 10-2019-0032058 A | 3/2019 |
| KR | 10-2020-0010028 A | 1/2020 |

OTHER PUBLICATIONS

International Search Report (PCT/ISA/210) issued in PCT/KR2021/016661, dated Mar. 3, 2022.

* cited by examiner

300′

ELECTRODE ASSEMBLY AND SECONDARY BATTERY INCLUDING THE SAME

CROSS-REFERENCE TO RELATED APPLICATION

This application claims priority to and the benefit of Korean Patent Application No. 10-2020-0152524 filed in the Korean Intellectual Property Office on Nov. 16, 2020, and Korean Patent Application No. 10-2021-0153233 filed in the Korean Intellectual Property Office on Nov. 9, 2021, the entire contents of which are incorporated herein by reference.

TECHNICAL FIELD

The present invention relates to an electrode assembly and a secondary battery including the same, and more particularly, to an electrode assembly of a jelly-roll structure and a secondary battery including the same.

BACKGROUND ART

Recently, due to the depletion of fossil fuels, the price of an energy source is increased and interest in environmental pollution is greatly increased, and the demand for an eco-friendly alternative energy source is becoming an essential factor for the future. Accordingly, research on various power production technologies, such as nuclear power, solar power, wind power, and tidal power, is continuing, and power storage devices for using the generated energy more efficiently are also of great interest.

In particular, as technology development and demand for mobile devices increase, the demand for batteries as an energy source is rapidly increasing, and accordingly, a lot of research on batteries capable of meeting various needs is being conducted.

Typically, there is a high demand for lithium secondary batteries, such as lithium ion batteries and lithium ion polymer batteries, which have advantages, such as high energy density, discharge voltage, and output stability.

In addition, depending on the shape of the battery case, the secondary battery is classified into a cylindrical battery and a prismatic battery in which the electrode assembly is embedded in a cylindrical or prismatic metal can, and a pouch-type battery in which the electrode assembly is embedded in a pouch-type case of an aluminum laminate sheet.

In addition, secondary batteries are classified according to the structure of the electrode assembly in which a positive electrode, a negative electrode, and a separation membrane interposed between the positive electrode and the negative electrode are stacked.

Typically, the electrode assembly may include a jelly-roll type electrode assembly in which long sheet-shaped positive electrodes and negative electrodes are wound with a separation membrane interposed therebetween, and a stack-type electrode assembly in which a plurality of positive and negative electrodes, which have been cut into units of a predetermined size, are sequentially stacked with a separation membrane interposed therebetween.

The jelly-roll type electrode assembly may be formed by winding a positive electrode and a negative electrode, and in this case, the positive electrode and the negative electrode are wound in the state where a separation membrane is interposed between the positive electrode and the negative electrode. However, as the charging/discharging cycle repeated hundreds to thousands of times proceeds, contraction and expansion of the jelly-roll type electrode assembly occurs, and thus bending deformation from the end of the positive electrode in the center is caused, resulting in cracks and disconnection or short circuit and greatly impairing the safety of the secondary battery.

DISCLOSURE

Technical Problem

The problem to be solved by the present invention is to provide an electrode assembly capable of preventing cracks generable in an electrode during contraction and expansion of a secondary battery, and a secondary battery including the same.

However, the problem to be solved in the exemplary embodiments of the present invention is not limited to the foregoing problem, and may be variously extended in the scope of the technical spirit included in the present invention.

Technical Solution

An exemplary embodiment of the present invention provides an electrode assembly, including: a first electrode; a second electrode; a first separation membrane interposed between the first electrode and the second electrode, in which the first electrode, the second electrode, and the first separation membrane are wound together to form a jelly-roll structure, and an auxiliary separation member disposed between the first electrode and the first separation membrane in a center of the jelly-roll structure.

Each of the first separation membrane and the auxiliary separation membrane may include a base layer and a coating layer.

An end of the first electrode may be in contact with the coating layer of the auxiliary separation membrane.

The first electrode may be a positive electrode, and the second electrode may be a negative electrode.

The auxiliary separation membrane may be wound 0.5 times or more and 1.5 times or less of a winding circumference at the center of the jelly-roll structure.

The second electrode may include a current collector, an active material layer locater on a first region of the current collector, a second region on which the active material layer is not located on the current collector, and an electrode tab bonded to the second region, and in the center of the jelly-roll structure, and in the center of the jelly-roll structure, an end of the first electrode may be disposed while being spaced apart from the electrode tab.

In the center, the end of the first electrode may be spaced apart from the end of the electrode tab by $1/4$ or more of a winding circumference of the jelly-roll structure.

The coating layer may include ceramic particles including at least one of alumina, silica, $TiO_2$, SiC, or $MgAl_2O_4$.

The base layer may include one of polyethylene (PE), polystyrene (PS), polypropylene (PP), or a copolymer of polyethylene (PE) and polypropylene (PP).

The first separation membrane may be disposed so that the coating layer faces the first electrode.

The auxiliary separation membrane may be extended from the first separation membrane and be formed integrally with the first separation membrane.

The integrally formed first separation membrane and auxiliary separation membrane may include a separation membrane region disposed between the first electrode and the second electrode, and an auxiliary separation membrane region disposed between the separation membrane region and the first electrode.

The integrally formed first separation membrane and auxiliary separation membrane may include a base layer, a first coating layer located on a first surface of the base layer in the separation membrane region, and a second coating layer located on a second surface of the base layer in the auxiliary separation membrane region, and the first and second surfaces are opposite to each other.

The first coating layer located in the separation membrane region may be disposed to face the first electrode.

The electrode assembly may include a second separation membrane located such that the second electrode is disposed between the first separation membrane and the second separation membrane.

The second coating layer located in the auxiliary separation membrane region may be disposed to face the first electrode.

Another exemplary embodiment of the present invention provides a secondary battery including the electrode assembly.

Advantageous Effects

According to the exemplary embodiments of the present invention, by forming the separation membrane in the portion corresponding to the end of the portion where the winding of the positive electrode starts in a double-layer structure in the electrode assembly, it is possible to prevent cracks of the negative electrode in a portion that is in contact with the end of the positive electrode to prevent disconnection or short circuits, thereby improving safety of the secondary battery.

The effects of the present invention are not limited to the foregoing effects, and other non-mentioned effects will be clearly understood by those skilled in the art from the description below.

MODE FOR INVENTION

Figure 1:
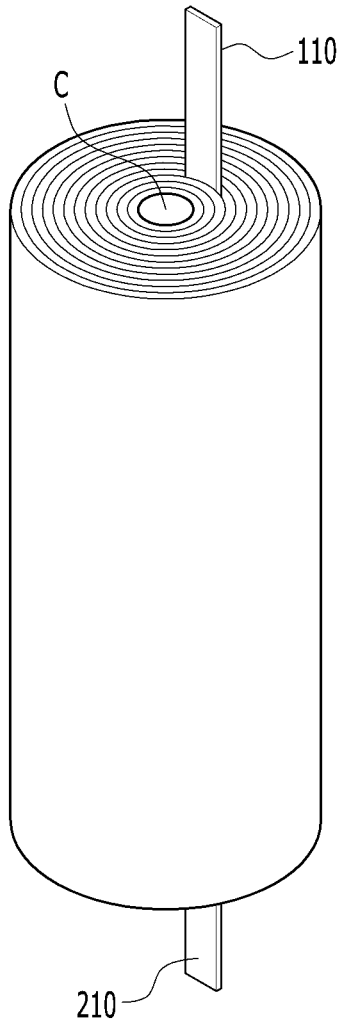
FIG. 1 is a perspective view of an electrode assembly according to an exemplary embodiment of the present invention.

In the following detailed description, only certain exemplary embodiments of the present invention have been shown and described, simply by way of illustration. However, the present invention can be variously implemented and is not limited to the following embodiments.

Accordingly, the drawings and description are to be regarded as illustrative in nature and not restrictive. Like reference numerals designate like elements throughout the specification.

In addition, the size and thickness of each configuration shown in the drawings are arbitrarily shown for understanding and ease of description, but the present invention is not limited thereto. In the drawings, the thickness of layers, films, panels, regions, etc., are exaggerated for clarity. In the drawings, for understanding and ease of description, the thickness of some layers and areas is exaggerated.

Further, it will be understood that when an element such as a layer, film, region, or substrate is referred to as being "on" another element, it can be directly on the other element or intervening elements may also be present. In contrast, when an element is referred to as being "directly on" another element, there are no intervening elements present. Further, when an element is "on" a reference portion, the element is located above or below the reference portion, and it does not necessarily mean that the element is located "on" in a direction opposite to gravity.

In addition, unless explicitly described to the contrary, the word "comprise", and variations such as "comprises" or "comprising", will be understood to imply the inclusion of stated elements but not the exclusion of any other elements.

Further, in the entire specification, when it is referred to as "on a plane" it means when a target part is viewed from above, and when it is referred to as "on a cross-section", it means when the cross-section obtained by cutting a target part vertically is viewed from the side.

Figure 2:
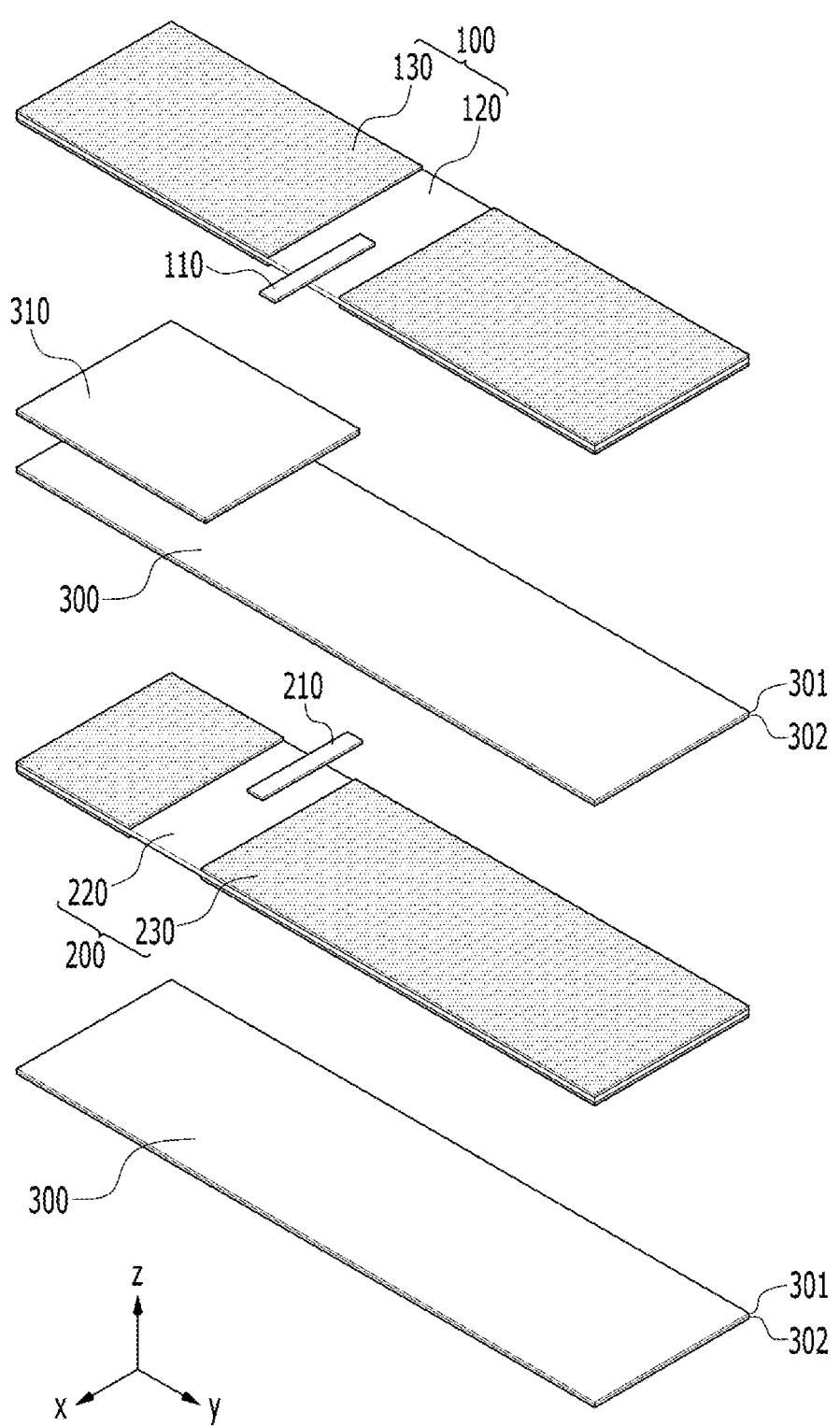
FIG. 2 is an exploded perspective view illustrating the state before the electrode assembly of FIG. 1 is wound.
Figure 3:
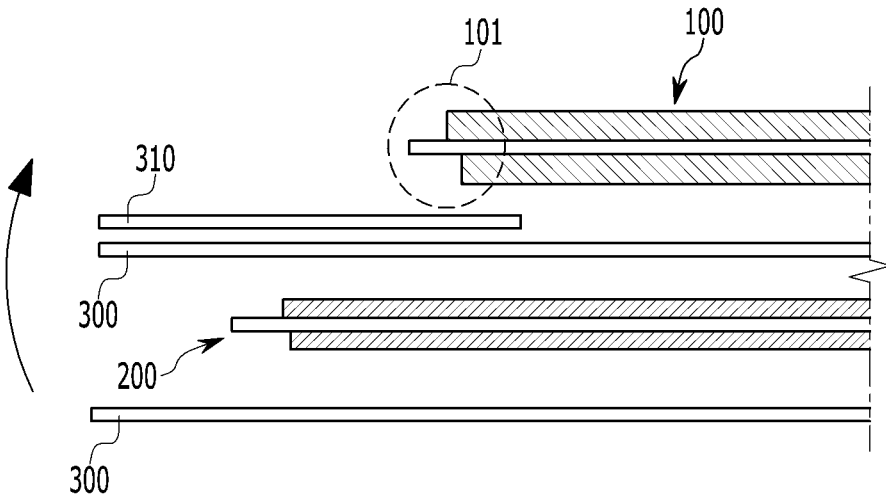
FIG. 3 is a cross-sectional view of an end portion before the electrode assembly of FIG. 1 is wound.

FIG. 1 is a perspective view of an electrode assembly according to an exemplary embodiment of the present invention, FIG. 2 is an exploded perspective view illustrating the state before the electrode assembly of FIG. 1 is wound, and FIG. 3 is a cross-sectional view of an end portion before the electrode assembly of FIG. 1 is wound.

Referring to FIGS. 1 to 3, the electrode assembly according to the exemplary embodiment of the present invention includes a first electrode 100, a second electrode 200, and a separation membrane 300 interposed between the first electrode 100 and the second electrode 200, and the first electrode 100, the second electrode 200, and the separation membrane 300 are wound together to form a jelly-roll structure. When the jelly-roll structure is formed, the separation membrane 300 is additionally disposed under the second electrode 200 in order to prevent the contact between the first electrode 100 and the second electrode 200. Further, an auxiliary separation membrane 310 is disposed between the innermost end 101 of the first electrode 100 and the separation membrane 300.

The first electrode 100 may include an electrode current collector 120 made of a thin metal plate and an active material layer 130 formed on the electrode current collector 120. The active material layer 130 may be formed by applying an electrode active material to the electrode current collector 120. In addition, after a portion of the electrode current collector 120 is exposed without applying an active material, a first electrode tab 110 may be bonded.

Similarly, the second electrode 200 may include an electrode current collector 220 made of a thin metal plate and an active material layer 230 formed on the electrode current collector 220. The active material layer 230 may be formed by applying an electrode active material to the electrode current collector 220. In addition, after a portion of the electrode current collector 220 is exposed without applying an active material, a second electrode tab 210 may be bonded.

The first electrode tab 110 and the second electrode tab 210 may protrude in opposite directions with respect to the electrode assembly of the jelly-roll structure.

Meanwhile, the first electrode 100 may be a positive electrode formed by applying a positive electrode active material to the electrode current collector 120, and the second electrode 200 may be a negative electrode formed by applying a negative electrode active material to the electrode current collector 220.

The separation membrane 300 may be formed by coating a coating layer 301 including ceramic particles on a base layer 302. The auxiliary separation membrane 310 may also include the base layer 302 and a coating layer 301 formed thereon in the same manner as the separation membrane 300. For example, the base layer 302 may include any one selected from the group consisting of polyethylene (PE), polystyrene (PS), polypropylene (PP), and a copolymer of polyethylene (PE) and polypropylene (PP). The coating layer 301 may include ceramic particles including at least one selected from the group consisting of alumina, silica, $TiO_2$, SiC, and $MgAl_2O_4$. The coating layer 301 including such ceramic particles may be formed by applying a mixed slurry of the ceramic particles and a binder to the base layer 302. In addition, the foregoing coating layer 301 is included, so that the safety of the electrode assembly may be enhanced. As illustrated in FIG. 2, all of the coating layers 301 may be disposed to face the first electrode 100 to prevent problems of cracks and overheating that may occur from the edge 101 of the first electrode 100 that is the positive electrode.

Hereinafter, with further reference to FIGS. 4 and 5, the structure in the center (C) of the jelly-roll structure will be described.

Figure 4:
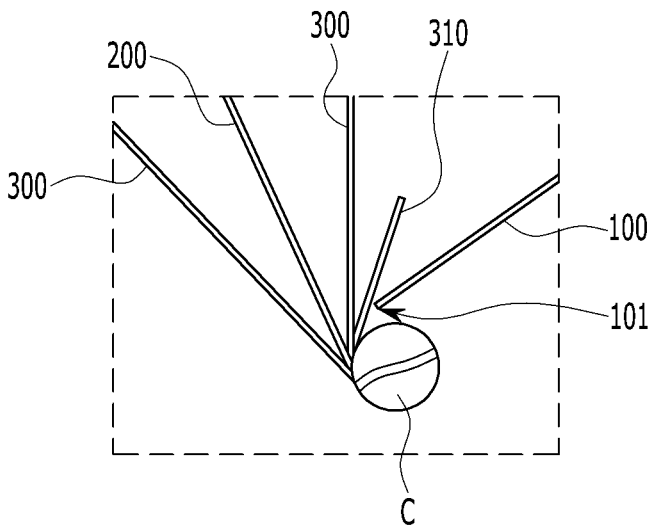
FIG. 4 is an enlarged view of a center of the electrode assembly when the electrode assembly is wound.
Figure 5:
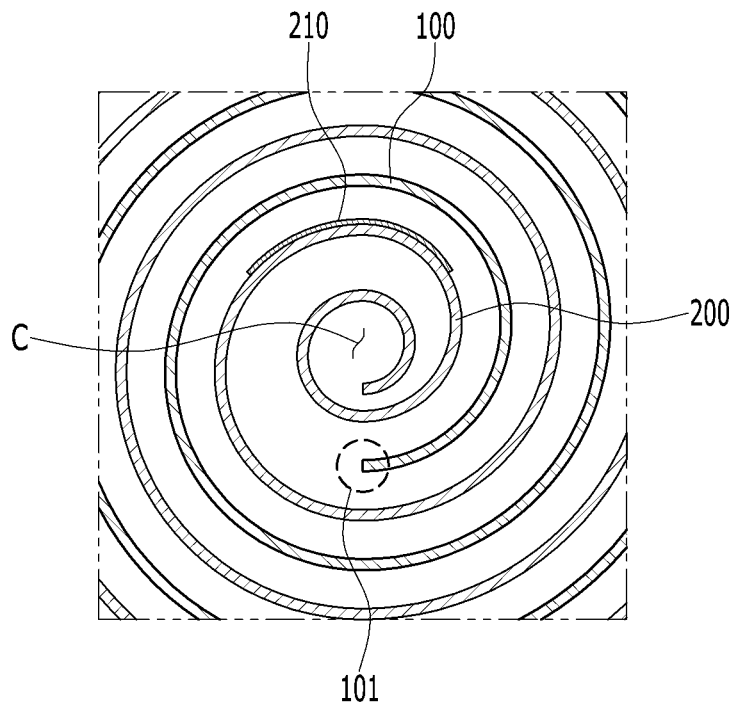
FIG. 5 is a partial view of the enlarged center of the electrode assembly at the lower side of FIG. 1.

FIG. 4 is an enlarged view of a center of the electrode assembly when the electrode assembly is wound, and FIG. 5 is a partial view of the enlarged center of the electrode assembly at the lower side of FIG. 1. In particular, in FIG. 5, illustration of the separation membrane 300 interposed between the first electrode 100 and the second electrode 200 is omitted for convenience of description.

Referring to FIGS. 4 and 5, in the jelly-roll structure according to the present exemplary embodiment, the auxiliary separation membrane 310 is included between the innermost end 101 of the first electrode 100 and the separation membrane 300. At this time, both the auxiliary separation membrane 310 and the coating layer 301 (see FIG. 2) included in the separation membrane 300 are disposed to face the first electrode 100. The innermost end 101 of the first electrode 101 may be in contact with the auxiliary separation membrane 310.

Here, the center C of the jelly-roll structure is the center of the circular structure when the jelly-roll structure is viewed from above, and refers to a virtual region corresponding to the part where the winding is started. In the winding process, as illustrated in FIG. 4, the electrode assembly includes a rod-shaped winding core having a circular cross-section, and the jelly-roll structure may be wound based on the winding core as a support, and the corresponding winding core may be removed from the center upon completion of winding. In addition, the innermost end 101 of the first electrode 100 refers to one end of the first electrode 100 at which winding starts first.

As illustrated in FIGS. 3 and 4, by configuring the innermost end 101 of the first electrode 100 to be in contact with the double separation membranes 300 and 310, it is possible to prevent the occurrence of cracks and overheating that may occur from the end of the first electrode 100. That is, as the design requirement of high energy density increases, the density increase of the first electrode 100, that is, the positive electrode, is unavoidable, and thus stress in a stepped portion of the positive electrode is increased. Here, the stepped portion of the positive electrode is a portion in which a physical step is formed in the jelly-roll electrode assembly as the thickness increases rapidly to 100 μm to 200 μm according to the interposition of the positive electrode at the start point of the positive electrode, and is the portion corresponding to the innermost end 101 of the first electrode 100 in the drawing. In the stepped portion of the positive electrode, the stress is high, and therefore, when the corresponding portion is continuously pressed during the contraction and expansion process due to charging and discharging, the separation membrane at the portion which is in contact with the corresponding portion is damaged, and there is a high risk of ignition due to cracks and short circuits. However, according to the exemplary embodiment of the present invention, as described above, since the innermost end 101 of the first electrode is in contact with the double separation membranes 300 and 310, damage to the separation membrane in the stepped portion of the positive electrode is prevented and a stable buffer action is possible, so that it is possible to prevent cracks and short circuits caused by repetition of contraction and expansion at the end of the positive electrode having high stress, thereby preventing the risk of ignition.

That is, as the repeated charge/discharge cycle proceeds hundreds to thousands of times, contraction and expansion of the electrode may occur, which causes bending deformation at the end 101 of the first electrode 100, and thus the crack of the electrode may be generated. However, the electrode assembly includes the double separation membrane including the auxiliary separation membrane 310 and the coating layer 301 of the separation membrane 300 and the auxiliary separation membrane 310 is disposed to face the first electrode 100, so that it is possible to prevent the occurrence of cracks and short circuits caused by the contraction and expansion of the end 101 of the first electrode 100 and ignition due to the crack and the short circuits.

The auxiliary separation membrane 310 may be formed to have the same configuration as that of the separation membrane 300, and may be wound up by 0.5 or more and 1.5 or less times in the jelly-roll structure so as to be in contact with the innermost end 101 of the first electrode 100. That is, when the winding core is located in the center C as illustrated in FIG. 4, the auxiliary separation membrane 310 may be formed to wind a circumference of the winding core 0.5 to 1.5 times. Further, the present invention is not limited thereto, and the length of the auxiliary separation membrane 310 may be adjusted so as to wind the circumference of the winding core by 0.5 to 1.5 times while starting the winding from the innermost end portion of the auxiliary separation membrane 310.

In the meantime, based on the jelly-roll structure, the innermost end of the second electrode 200 may be located closer to the center C of the jelly-roll structure than the innermost end 101 of the first electrode 100.

In particular, in the center C of the jelly-roll structure, the second electrode 200 may be wound to extend beyond the first electrode 100. That is, after the second electrode 200 and the separation membrane 300 are first wound to some extent, the first electrode 100 may be interposed so that the second electrode 200, the separation membrane 300, and the first electrode 100 may be wound together. The first electrode 100 and the second electrode 200 may be a positive electrode and a negative electrode, respectively, and in the chemical reaction of a lithium ion battery, since the negative electrode must receive lithium ions from the positive electrode, it is preferable that the negative electrode is designed to have a wider length and width than the positive electrode. When the length or width of the positive electrode is formed larger, the space to receive lithium ions is insufficient, so charging and discharging cannot be performed smoothly, and the risk of explosion may increase. Accordingly, it is preferable that the second electrode 200, which is the negative electrode, is wound before the first electrode 100, which is the positive electrode, at the center C where the winding of the jelly-roll electrode assembly starts. For example, the first electrode 100 may be interposed after the second electrode 200 is wound once or twice before the winding of the first electrode 100. Accordingly, as described above, with respect to the jelly-roll structure, the innermost end of the second electrode 200 may be located closer to the center C of the jelly-roll structure than the innermost end 101 of the first electrode 100.

In addition, as illustrated in FIG. 5, when viewed from the lower end of the electrode assembly, the second electrode tab 210 protruding outward may be spaced apart so as not to overlap the innermost end 101 of the first electrode 100 in the center C. That is, the second electrode tab 210 is a portion electrically connected to the outside, and a lot of heat may be generated in the portion, and in this case, when the innermost end 101 of the first electrode 100 comes into contact with the second electrode tab 210 having a high heat value, bending deformation stress and cracking probability due to contraction and expansion during repeated charge/discharge cycles are increased. However, as illustrated in FIG. 5, the second electrode tab 210 and the innermost end 101 of the first electrode 100 are disposed so as not to overlap each other, thereby reducing the risk occurrence probability.

In particular, to this end, the innermost end 101 of the first electrode 100 is preferably spaced apart from the end of the second electrode tab 210 along the winding circumference by ¼ or more of the winding circumference. This means that in FIG. 5, the distance from the end of the second electrode tab 210 to the innermost end 101 of the first electrode 100 is ¼ or more of the winding circumference in the corresponding portion of the first electrode 100. As described above, by sufficiently separating the innermost end 101 of the first electrode 100 from the second electrode tab 210, the amount of heating is high and it is possible to prevent the second electrode tab 210 that is the portion in which the step is generated due to the thickness from being in contact with the innermost end 101 of the first electrode 100, so that bending deformation stress and occurrence probability of cracks due to contraction and expansion when the charge/discharge cycle is repeated are lowered, thereby significantly reducing occurrence probability of internal short circuit or ignition. In addition, the foregoing configuration may be obtained by adjusting the relative positions of the second electrode 200, the second electrode tab 210, and the first electrode 100 at the winding start point, that is, the center C, during winding.

Next, another exemplary embodiment of the present invention will be described with reference to FIGS. 6 and 7.

Figure 6:
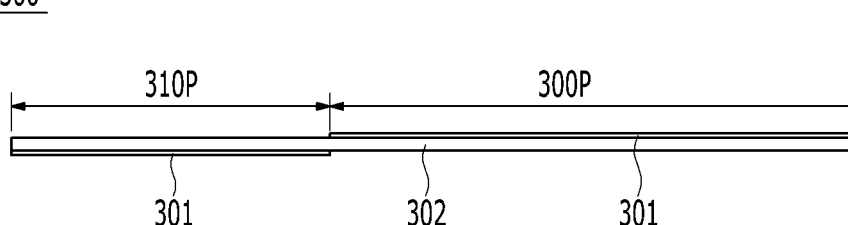
FIG. 6 is a diagram illustrating a cross-section of a part of a separation membrane applied to an electrode assembly according to another exemplary embodiment of the present invention.
Figure 7:
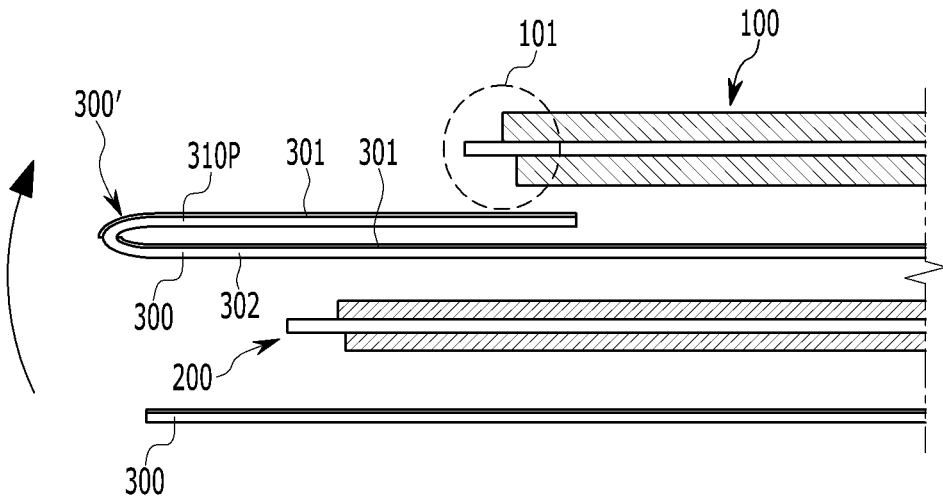
FIG. 7 is a diagram illustrating a cross-section of an end portion before the electrode assembly is wound in the electrode assembly according to another exemplary embodiment to which the separation membrane of FIG. 6 is applied.

FIG. 6 is a diagram illustrating a cross-section of a part of a separation membrane applied to an electrode assembly according to another exemplary embodiment of the present invention, and FIG. 7 is a diagram illustrating a cross-section of an end portion before the electrode assembly is wound in the electrode assembly according to another exemplary embodiment to which the separation membrane of FIG. 6 is applied.

As illustrated in FIGS. 6 and 7, in another exemplary embodiment of the present invention, a separation membrane 300' is folded so that an end is integrally extended from the separation membrane 300' becomes an auxiliary separation membrane. Except for this, other configurations are the same as those of the foregoing exemplary embodiment, so a description of the overlapping configuration will be omitted.

Referring to FIGS. 6 and 7, in an electrode assembly according to another exemplary embodiment of the present invention, a portion of the separation membrane 300' forms a separation membrane region 300P disposed between a first electrode 100 and a second electrode 200, and the remaining portion forms an auxiliary separation membrane region 310P disposed between the separation membrane region 300P and the first electrode 100. The separation membrane region 300P and the auxiliary separation membrane region 310P form the integrally formed separation membrane 300', before being wound, as illustrated in FIG. 7, the auxiliary separation membrane region 310P is folded to be located above the separation membrane region 300P, and the auxiliary separation membrane region 310P is disposed between the separation membrane region 300P and the first electrode 100. With the foregoing configuration, without providing an auxiliary separation membrane, the separation membrane is integrally extended and is folded to serve as an auxiliary separation membrane, the separation membrane in the portion which is in contact with the end of the positive electrode is formed in a double layer by a simpler structure, so that it is possible to prevent cracks of the negative electrode in the portion that is in contact with the end of the positive electrode to prevent short circuits, thereby improving safety of the secondary battery.

In this case, the separation membrane 300' includes a base layer 302 and a coating layer 301 similar to the foregoing exemplary embodiment, but the positions at which the coating layer 301 is disposed are located to be opposite to each other in the separation membrane region 300P and the auxiliary separation membrane region 310P. That is, as illustrated in FIG. 6, in the auxiliary separation membrane region 310P, the coating layer 301 is formed on a surface opposite to the surface on which the coating layer 301 is formed in the separation membrane region 300P. With the foregoing configuration, even though the auxiliary separation membrane region 310P is disposed between the separation membrane region 300P and the first electrode 100 by folding as illustrated in FIG. 7, the coating layers of the auxiliary separation membrane region 310P and the separation membrane region 300P may be disposed to face the positive electrode, that is, the first electrode 100. Accordingly, even in the electrode assembly according to another exemplary embodiment of the present invention, it is possible to effectively prevent cracks and short circuits caused by contraction and expansion of the end portion 101 of the first electrode 100, and ignition due to the cracks and the short circuits.

In the present exemplary embodiment, terms indicating directions, such as front, rear, left, right, up, and down, are used, but these terms are for convenience of explanation only, and may vary depending on the location of the object or the position of the observer.

The electrode assembly according to the present exemplary embodiment described above may be accommodated in a battery case together with an electrolyte to form a secondary battery, and the secondary battery may be applied to various devices. Specifically, the electrode assembly may be applied to transportation means, such as an electric bicycle, an electric vehicle, and a hybrid vehicle, but is not limited thereto, and the electrode assembly may be applied to various devices that can use a secondary battery.

Although an exemplary embodiment of the present invention has been described in detail, the scope of the present invention is not limited by the embodiment. Various changes and modifications using the basic concept of the present invention defined in the accompanying claims by those skilled in the art shall be construed to belong to the scope of the present invention.

The invention claimed is:

1. An electrode assembly, comprising:
a first electrode;
a second electrode;
a first separation membrane interposed between the first electrode and the second electrode, wherein the first electrode, the second electrode, and the first separation membrane are wound together to form a jelly-roll structure; and
an auxiliary separation membrane disposed between the first electrode and the first separation membrane in a center of the jelly-roll structure,
wherein the auxiliary separation membrane is a separate membrane stacked on the first separation membrane to overlap an end of the first electrode at the center of the jelly-roll structure without extending beyond the first separation membrane, and
wherein each of the first separation membrane and the auxiliary separation membrane includes a base layer and a coating layer.

2. The electrode assembly of claim 1, wherein:
the end of the first electrode is in contact with the coating layer of the auxiliary separation membrane.

3. The electrode assembly of claim 1, wherein:
the first electrode is a positive electrode, and the second electrode is a negative electrode.

4. The electrode assembly of claim 1, wherein:
the auxiliary separation membrane is wound 0.5 times or more and 1.5 times or less of a winding circumference at the center of the jelly-roll structure.

5. The electrode assembly of claim 1, wherein:
the second electrode includes a current collector, an active material layer located on a first region of the current collector, a second region on which the active material layer is not located on the current collector, and an electrode tab bonded to the second region, and
in the center of the jelly-roll structure, the end of the first electrode is disposed while being spaced apart from the electrode tab.

6. The electrode assembly of claim 5, wherein:
in the center, the end of the first electrode is spaced apart from the end of the electrode tab by ¼ or more of a winding circumference of the jelly-roll structure.

7. The electrode assembly of claim 1, wherein:
the coating layer includes ceramic particles including at least one of alumina, silica, $TiO_2$, SiC, or $MgAl_2O_4$.

8. The electrode assembly of claim 1, wherein:
the base layer includes one of polyethylene (PE), polystyrene (PS), polypropylene (PP), or a copolymer of polyethylene (PE) and polypropylene (PP).

9. The electrode assembly of claim 1, wherein:
the first separation membrane is disposed so that the coating layer faces the first electrode.

10. An electrode assembly, comprising:
a first electrode;
a second electrode;
a first separation membrane interposed between the first electrode and the second electrode, wherein the first electrode, the second electrode, and the first separation membrane are wound together to form a jelly-roll structure; and
an auxiliary separation membrane disposed between the first electrode and the first separation membrane in a center of the jelly-roll structure,
wherein:
the auxiliary separation membrane is extended from the first separation membrane and is formed integrally with the first separation membrane,
the integrally formed first separation membrane and auxiliary separation membrane includes a separation membrane region disposed between the first electrode and the second electrode, and an auxiliary separation membrane region disposed between the separation membrane region and the first electrode,
the integrally formed first separation membrane and auxiliary separation membrane includes a base layer, a first coating layer located on a first surface of the base layer in the separation membrane region, and a second coating layer located on a second surface of the base layer in the auxiliary separation membrane region, and
the first and second surfaces are opposite to each other.

11. The electrode assembly of claim 10, wherein:
the first coating layer located in the separation membrane region is disposed to face the first electrode.

12. The electrode assembly of claim 10, wherein:
the second coating layer located in the auxiliary separation membrane region is disposed to face the first electrode.

13. A secondary battery comprising the electrode assembly of claim 1.

14. The electrode assembly of claim 1, further comprising a second seperation membrane located such that the second electrode is disposed between the first seperation membrane and the second separation membrane.

* * * * *